United States Patent [19]

Treu

[11] Patent Number: 5,245,615
[45] Date of Patent: Sep. 14, 1993

[54] DIAGNOSTIC SYSTEM AND INTERFACE FOR A PERSONAL COMPUTER

[75] Inventor: Albert R. Treu, Boca Raton, Fla.

[73] Assignee: International Business Machines Corporation, Armonk, N.Y.

[21] Appl. No.: 711,003

[22] Filed: Jun. 6, 1991

[51] Int. Cl.$^5$ .............................................. G01R 31/28
[52] U.S. Cl. ................................... 371/16.5; 371/22.5
[58] Field of Search ................. 371/16.5, 18, 22.5, 371/25.1, 29.1

[56] References Cited

PUBLICATIONS

"Loadable ABIOS" by Richard Bezlkowski, IBM Personel Systems Magazine/Jan. 93.

*Primary Examiner*—Vincent P. Canney
*Attorney, Agent, or Firm*—George E. Grosser; Douglas R. McKechnie

[57] ABSTRACT

A personal computer has a NVRAM comprising an error log for storing predetermined error log information at predetermined locations therein. The information is accessible by various programs such as a POST program, a diagnostics program, and an operating system program. Access is made by BIOS interrupt calls through a BIOS interface. The NVRAM also stores vital product data and system setup data.

12 Claims, 7 Drawing Sheets

DIAGNOSTIC SYSTEM AND INTERFACE FOR A PERSONAL COMPUTER

FIELD OF THE INVENTION

This invention relates to the field of data processing, and, more particularly, to an improved diagnostic system and interface for a personal computer.

BACKGROUND OF THE INVENTION

As is well known, personal computers are relatively small and inexpensive data processing systems primarily designed to provide a single user with independent computing power. Personal computers are available in a variety of sizes including desk-top, floor-standing, and portable models. A typical personal computer includes a system unit containing a microprocessor, a monitor, a printer, an internal hard disk drive, and a diskette drive. Specific examples are the different models of the IBM PS/2 personal computers. In contrast, larger, more expensive data processing systems such as the IBM System/370 computers, are characterized as "mainframe" systems and are primarily designed to provide computing power to multiple users. Mainframe systems have also been provided with relatively elaborate diagnostic systems which heretofore have been absent from personal computers.

Diagnostic systems are provided to increase the reliability, availability, and serviceability (RAS) of data processing systems. In general, diagnostic systems detect and analyze errors or faults that occur in the hardware and software portions of a data processing system while the system is being tested or operated. A diagnostic system in a mainframe system typically detects errors as they occur and logs such errors for later analysis by a diagnostic program. In contrast, diagnostic systems particularly for the above examples of personal computers, provide a narrow set of functions limited to displaying to the user a cryptic error code or message as errors are detected during a power on self test, or while the system is operating normally, or as a result of running a test or diagnostic program. The user is then left with the problem of deciding what the code or message means and what to do about it.

Another characteristic of mainframe systems is that they are closed systems having RAS features oriented to specific operating systems (OS). Status information is stored in distributed places at the hardware level and the particular operating system designed for the hardware "knows" where to go to obtain such information. There is no interface and the operating system directly accesses the desired information.

SUMMARY OF THE INVENTION

One of the objects of the invention is to provide an improved diagnostic system and interface for use in an open ended personal computer that is operable under different operating systems.

Another object of the invention is to provide a diagnostic system and interface for a personal computer, which are operating system independent and can be used with different operating systems.

A further object of the invention is to provide a personal computer diagnostic system interface that is contained in a software layer beneath an operating system, and provides an error logging communications area that can readily be later accessed after error logging has occurred.

Still another object of the invention is to provide a personal computer diagnostic interface in a basic I/O operating system (BIOS) for use in logging and accessing error information in a non-volatile random access memory (NVRAM).

Another object of the invention is to provide a novel error log data structure in a NVRAM, for use in logging errors and diagnosis of such errors.

Briefly, in accordance with the invention, a personal computer has a NVRAM comprising an error log address space for storing predetermined error information at predetermined locations. Such error information is accessible by other programs, including an operating system, through a BIOS interface and is independent of the operating system.

DRAWINGS

Other objects and advantages of the invention will be apparent from the following description taken in connection with the accompanying drawings wherein.

DETAILED DESCRIPTION

Figure 1:
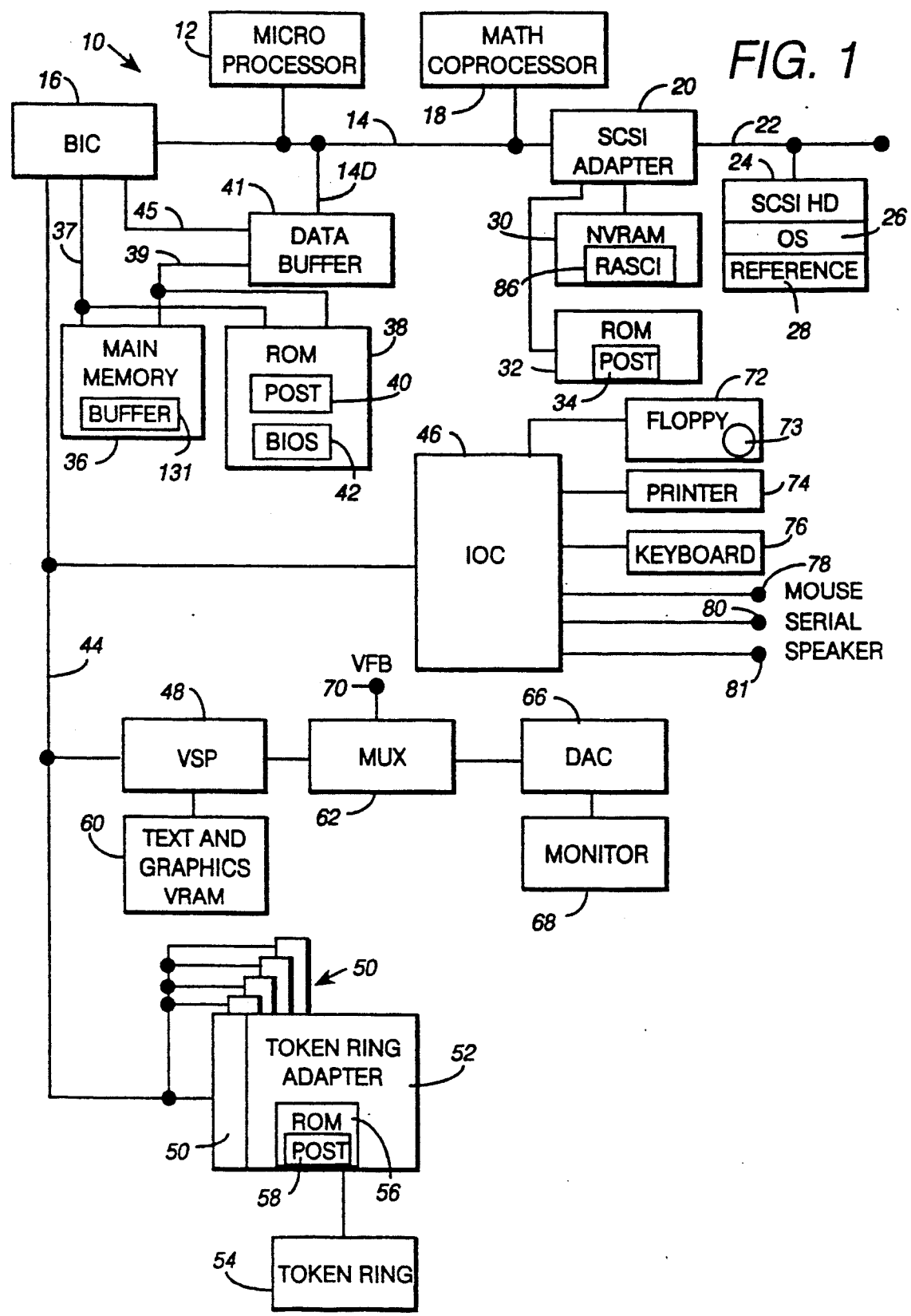
FIG. 1 is a block diagram of a personal computer embodying the invention.

Referring now to the drawings, and first to FIG. 1, there is shown an exemplary data processing system comprising a personal computer 10 operable under an operating system such as PC DOS or OS/2. Computer 10 comprises a microprocessor 12 connected to a local bus 14 which, in turn, is connected to a bus interface controller (BIC) 16, a math coprocessor 18, and a small computer system interface (SCSI) adapter 20. Microprocessor 12 is preferably one of the family of 80xxx microprocessors, such as an 80386 microprocessor, and local bus 14 includes conventional data, address, and control lines conforming to the architecture of such processor. Adapter 20 is also connected to a SCSI bus 22 which is connected to a SCSI hard drive (HD) 24 designated as the C:drive, the bus also being connectable to other SCSI devices (not shown). SCSI HD 24 includes a first partition 26 for an operating system (OS) and a second partition 28 for storing reference diskette information. Adapter 20 is also connected to a NVRAM 30 and to a read only memory (ROM) 32 that stores a POST program 34 for testing adapter 20 and devices connected thereto through bus 22.

BIC 16 performs two primary functions, one being that of a memory controller for accessing a main memory 36 and a ROM 38. Main memory is a dynamic random access memory (RAM) that comprises one or more single, in-line, memory modules (SIMMS) and stores programs and data for execution by microprocessor 12 and math coprocessor 18. ROM 38 stores a POST program 40 and a BIOS 42. POST program 40 performs the primary test, i.e. POST, of the system when computer 10 is first powered on or is reset. An address and control bus 37 connects BIC 16 with memory 36 and ROM 38. A data bus 39 connects memory 36 and ROM 38 with a data buffer 41 that is further connected to data bus 14D of bus 14. Control lines 45 interconnect BIC 16 and data buffer 41.

The other primary function of BIC 16 is to interface between bus 14 and an I/O bus 44 designed in conformance with Micro Channel architecture. Bus 44 is further connected to an input/output controller (IOC) 46, a video signal processor (VSP) 48, and a plurality of Micro Channel connectors or slots 50. A token ring adapter 52 is mounted in one of slots 50 and is further connected to a token ring 54. Adapter 52 includes a ROM 56 and a POST program 58 for testing adapter 52 and ring 54. VSP 48 is further connected to a video RAM (VRAM) 60 and a multiplexor (MUX) 62. VRAM 60 stores text and graphic information for controlling what appears on the screen of a monitor 68. MUX 62 is further connected to a digital to analog converter (DAC) 68 and to a connector or terminal 70 that is connectable to a video feature bus (VFB). DAC 66 is connected to monitor 68 that provides a conventional output screen or display for viewing by a user.

IOC 46 controls operation of a floppy disc drive 72 designated as the A:drive, a printer 74, and a keyboard 76. Drive 72 comprises a removable floppy disc such as a reference diskette 73. IOC 46 also is connected to a mouse connector 78, a serial port connector 80, and a speaker connector 81 which allow various optional devices to be connected into the system.

Figure 2:
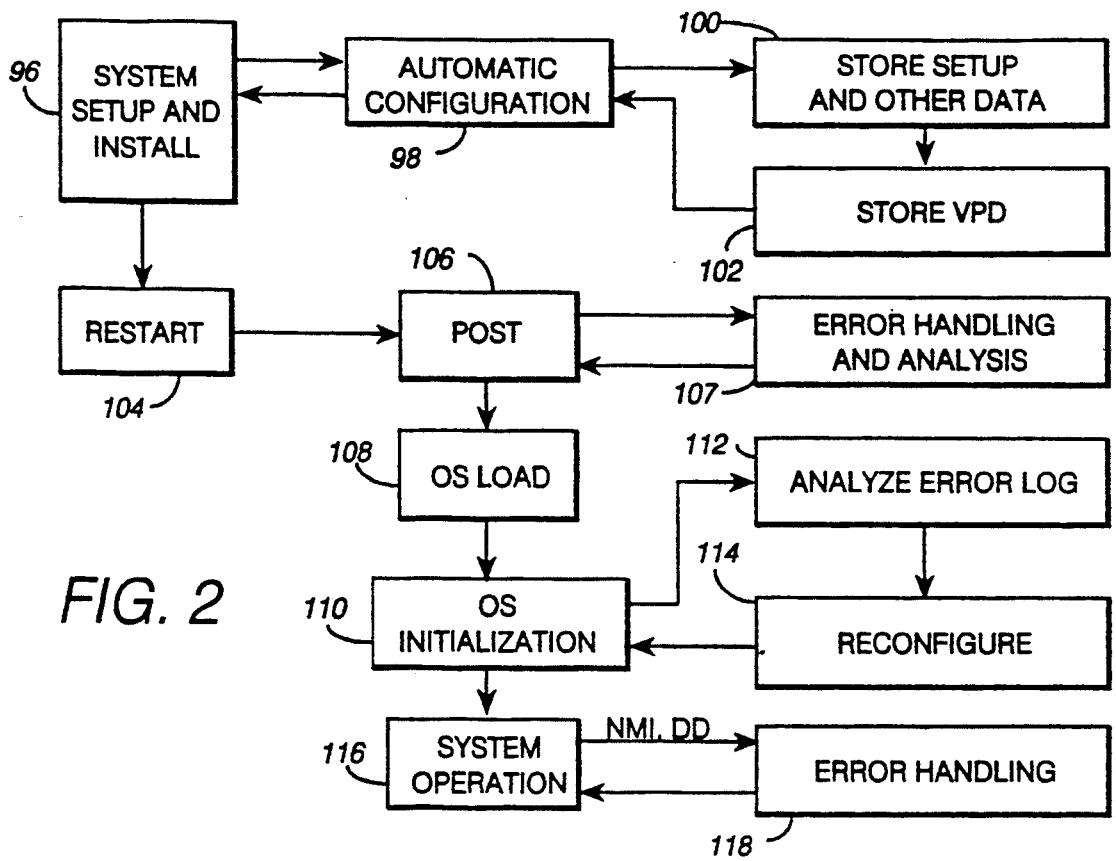
FIG. 2 is a flow diagram of the general operation of the computer shown in FIG. 1.
Figure 3:
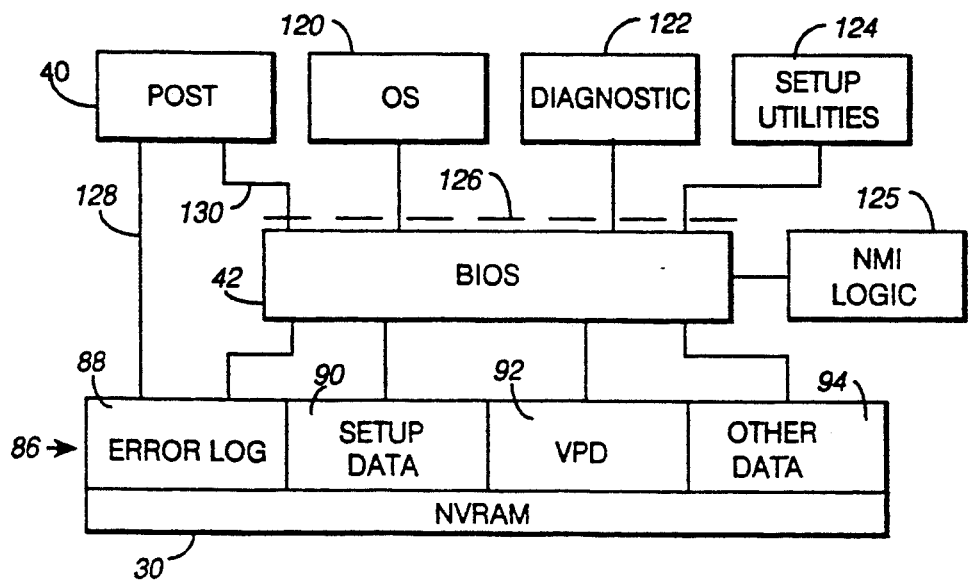
FIG. 3 is a block diagram showing further details of the NVRAM shown in FIG. 1.

NVRAM 30 includes a RAS communications interface (RASCI) 86, which as seen in FIG. 3, comprises four address spaces for an error log 88, vital product data (VPD) 92, setup data 90, and other data 94. FIG. 2 illustrates the general operation of computer 10 relative to use of NVRAM 30 in accordance with certain aspects of the invention. The general operation is shown in the left and center columns while operations relative to the NVRAM are shown in the right hand column. The general operation begins with step 96 wherein the computer is setup and software is installed in the same general manner as is commonly done in connection with initiating operation of the above mentioned PS/2 personal computers. During the course of step 96, POST program 40 is initially run while reference diskette 73 is loaded in the A:drive. During the course of running POST program 40 for the first time, a configuration error is detected, because the computer has not yet been configured, and the user is prompted to run an automatic configuration program on the reference diskette to perform step 98 and automatically configure computer 10. Also, during step 96, the various options are connected in the system, fixed disk 24 is formatted and partitioned, and the desired OS software is installed. During the course of configuring step 98, step 100 stores setup data and other data in spaces 90 and 94 of NVRAM. Such data is gathered in the usual fashion that includes reading programmable option select (POS) data from each adapter in the computer. Step 102 then gathers and stores the VPD in space 92.

After the hardware and software have been installed, computer 10 is thereafter restarted in step 104 by either turning the power back on or resetting the system by simultaneously pressing the control, alt, and delete keys of keyboard 76. Step 104 is also performed upon each subsequent restart of computer 10. After computer 10 is thus restarted, a POST 106 is performed by running POST program 40. In addition to testing the primary components of computer 10, the POST also executes adapter POST programs such as 34 and 58 to test their associated subsystems or adapters. Upon successful completion of POST 106, the OS kernel is loaded in step 108 into main memory 36 and the OS is initialized in step 110. Afterward, the system begins normal operation in step 116 where application programs are executed or run under control of the OS.

It is to be appreciated that errors can occur during any stage of operation but that the most frequent occurrence is during system operation in step 116. When an error occurs or is detected, an entry is made in error log 88 as described in detail hereinafter. The error log is analyzed in certain ones of the general steps described above. During POST 106, the error log is analyzed as described in detail relative to FIG. 7. During the course of OS initialization step 110, step 112 reads error log 88 and analyzes any entries therein to determine whether the computer can be reconfigured in step 114 so as to allow the computer to be operated even though a non-critical error has occurred. A non-critical error is one where the system can still be operated in some fashion but at a degraded level. For example, if a printer has developed a fault, the computer can be operated using monitor 68 as an output device. A critical error is one where further operational state cannot be maintained. Examples are losing a large block of memory 36, or losing use of drive 24 (C:drive). Upon completion of step 110, control is passed to step 116 to commence system operation of computer 10 wherein application programs are executed under the control of the OS.

Referring to FIG. 3, BIOS 42 is a software interface or "layer" that primarily isolates the operating system and application programs from specific hardware devices. The operating system and application programs make functional requests or calls to BIOS rather than directly manipulating I/O ports and control words of the hardware. BIOS 42 is accessed through an interface 126 of software interrupts and contains a plurality of entry points corresponding to the different interrupts. BIOS 42 provides many conventional services not germane to the invention.

In connection with the invention, BIOS 42 uses INT 15H (hex) as the basic interrupt call with different functions related thereto being selected by the setting of the AH and AL registers of microprocessor 12. VPD 92 is stored directly into NVRAM 30 during setup and is available thereafter through BIOS 42 on a read only basis. VPD 92 is read by setting AH=D2H. Spaces 90 and 94 are accessible in a manner similar to the prior art. Relative to accessing error log 88, register AH should be set to 21H. Register AL is set as follows for the indicated functions:

| Setting | Function |
| --- | --- |
| 3 | Reset all entries in error log 88. |
| 4 | Write to error log. |
| 5 | Read from error log. |
| 6 | Invalidate single entry in error log. |

In a preferred embodiment, error log 88 has a size of 109 contiguous bytes. The error log contains a data structure in which predetermined information is stored at predetermined locations to provide a standardized communications area for use by different programs including POST program 40, the OS, and diagnostic program 122. Quite obviously, any programmer using the error log has to know the log format or data structure, the BIOS interface thereto, and any return codes. Error log 88 includes a single byte for storing error log status. The remaining bytes are divided into three error log entries, each entry having thirty six bytes. Obviously, the size and number of entries may vary to accommodate different computers. The error log status byte uses the following bits thereof to store the indicated information:

| | |
|---|---|
| Bit 7 | Whether the OS has handled the log by passing information to diagnostics. |
| Bit 6 | Whether diagnostics has altered the system and is passing information in the log. |
| Bit 5 | Whether the log entry information requires processing by diagnostics. |

Each error log entry is divided a plurality of fields for storing the following general information:

| Bytes | General Information |
|---|---|
| 0-3 | LOG machine check status |
| 4-25 | Log format |
| 26-29 | Time of error |
| 30-33 | Date of error |
| 34-35 | Multiple log |

In general, the log machine check status information is a key as to what information is in the log format bytes. The log format bytes explain an error as to which program, component or FRU produced the error, where the error detector is located in the system, and what failure or error occurred. The time of error and date of error information identifies the time and date when an error occurred. Such fields are set each time an entry is made. Multiple log information is used to reduce the size of the log and eliminate plural entries for the same or similar errors by counting multiple occurrences of same errors from a single source or of the same error condition from different sources.

The following is further definition of the indicated bytes for each entry:

| | |
|---|---|
| Bytes 0-3 | LOG machine check status |
| Byte 0 | Log entry status |
| Bit 7 | Log entry valid |
| Bit 6 | Permanent error |
| Bit 5 | Temporary error |
| Bit 0 | Degraded mode- critical error bypassed |
| Byte 1 | Functional error further defines logic status of error |
| Bit 7 | Memory parity/ECC multiple bit error- error code extended status field (bytes 14-25) has error address |
| Bit 6 | ECC single bit error- error code extended status field has error address and syndrome check bits |
| Bit 5 | ECC counter overflow |
| Bit 4 | Processor error- error code extended status field has RAS error registers |
| Bit 3 | I/O error- error code extended status field has adapter slot in error, RAS error registers |
| Bit 2 | ABIOS log- error code extended status field has pointer of ABIOS error log |
| Bit 1 | Default interrupt condition- error code extended status field has default interrupt condition |
| Byte 3 | |
| Bit 0 | POST error information |
| Bytes 4-25 | Log format |
| Byte 4 | Type of log/functional area |
| Bits 7-4 | Type of log |
| 0001 | Problem |
| 0010 | Temporary |
| 0011 | Performance- counters |
| 0100 | History-problems repaired, update |
| 0101 | Information |
| Bits 3-0 | Functional area |
| 0001 | Processor complex |
| 0010 | Storage- DASD |
| 0011 | Communications |
| 0100 | I/O adapters, devices |
| 0101 | Microcode |
| 0110 | POST/diagnostics |
| 0111 | Software, operating system |
| 1000 | Software, applications |
| Bytes 5-25 | System error code |
| Byte 5-8 | Error code identification field |
| Byte 9 | Error code failure field |
| Byte 10-13 | Error code location field |
| Byte 14-25 | Error code extended status field |
| Byte 34-35 | Multiple log (counters for same error) |
| Byte 34 | |
| Bit 7=0 | Reduced log-multiple logs with same information |
| Bit 3-0 | Count field |
| Bit 7=1 | System log identification (SLID)- same ID for logs with information about same error condition from different source |
| Bit 6-0 | System Log ID (SLID) |
| Byte 35 | System log ID (SLID) |

(Bytes and bits not mentioned above are reserved)

VPD 92 is provided for products supporting the VPD function by including a ROM containing VPD information for a particular product. Such information is read from the product ROM into VPD 92 when the system is first powered up after the product adapter has been installed. Thus, relative to FIG. 1, when token ring adapter 52 is installed, the VPD data in ROM 56 is read into VPD 92. Specific VPD information includes a unique ID for each product type or model, a part number of a field replaceable unit (FRU) for ordering such part, a replaceable unit part number identifying the part for maintenance tracking, serial number, manufacturer ID, equipment categories, resource characteristics of functions associated with product or an indication that the resources are not known or not supported, engineering change level of FRU, device driver level, and diagnostic level. VPD 92, in addition to containing such information for each product, also contains an adapter ID, a system unique ID including model/submodel and BIOS revision level. Other information could also be included as required.

As previously indicated, BIOS 42 is functionally layered between RASCI 86 and OS 120 and is accessed through a software interface 126 by the specific interrupt calls described above. POST program 40 is normally above BIOS 42 and accesses RASCI 86 through interface 126 along path 130 but also has a path 128 for directly accessing error log 88 when an error occurs or is detected during the initial steps of POST 40 which occur before BIOS 42 is operational. Such direct accessing is discussed below relative to FIG. 6. A diagnostic program 122 and setup utilities 124 operate above BIOS 42 to access RASCI 86 through interface 126. Computer 10 also includes hardware or NMI logic 125 which detects an error and creates an NMI signal that is sent directly into BIOS 42 for handling by an NMI interrupt handler therein.

Figure 4:
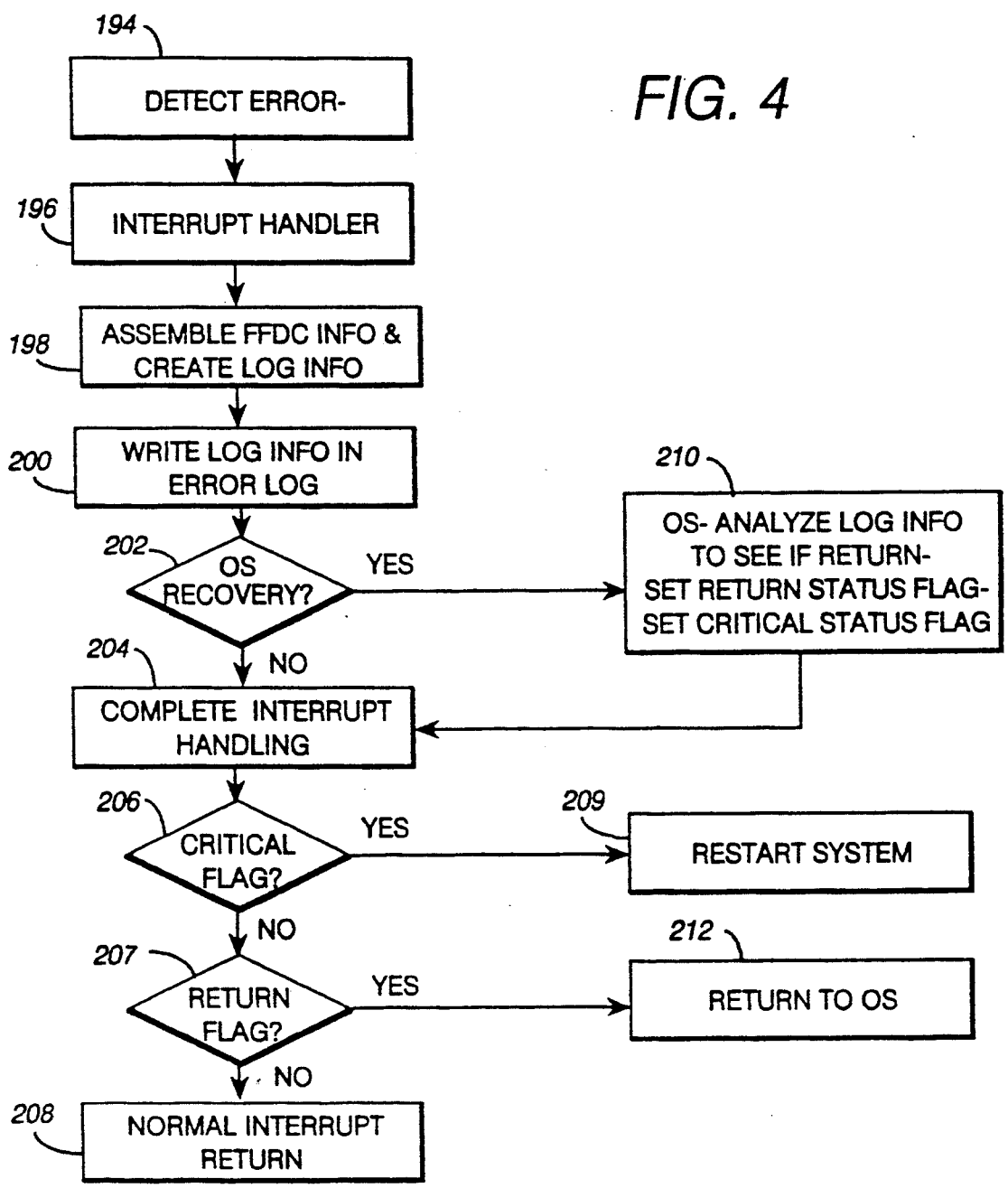
FIG. 4 is a flow diagram of steps occurring when OS detects a critical error.
Figure 5:
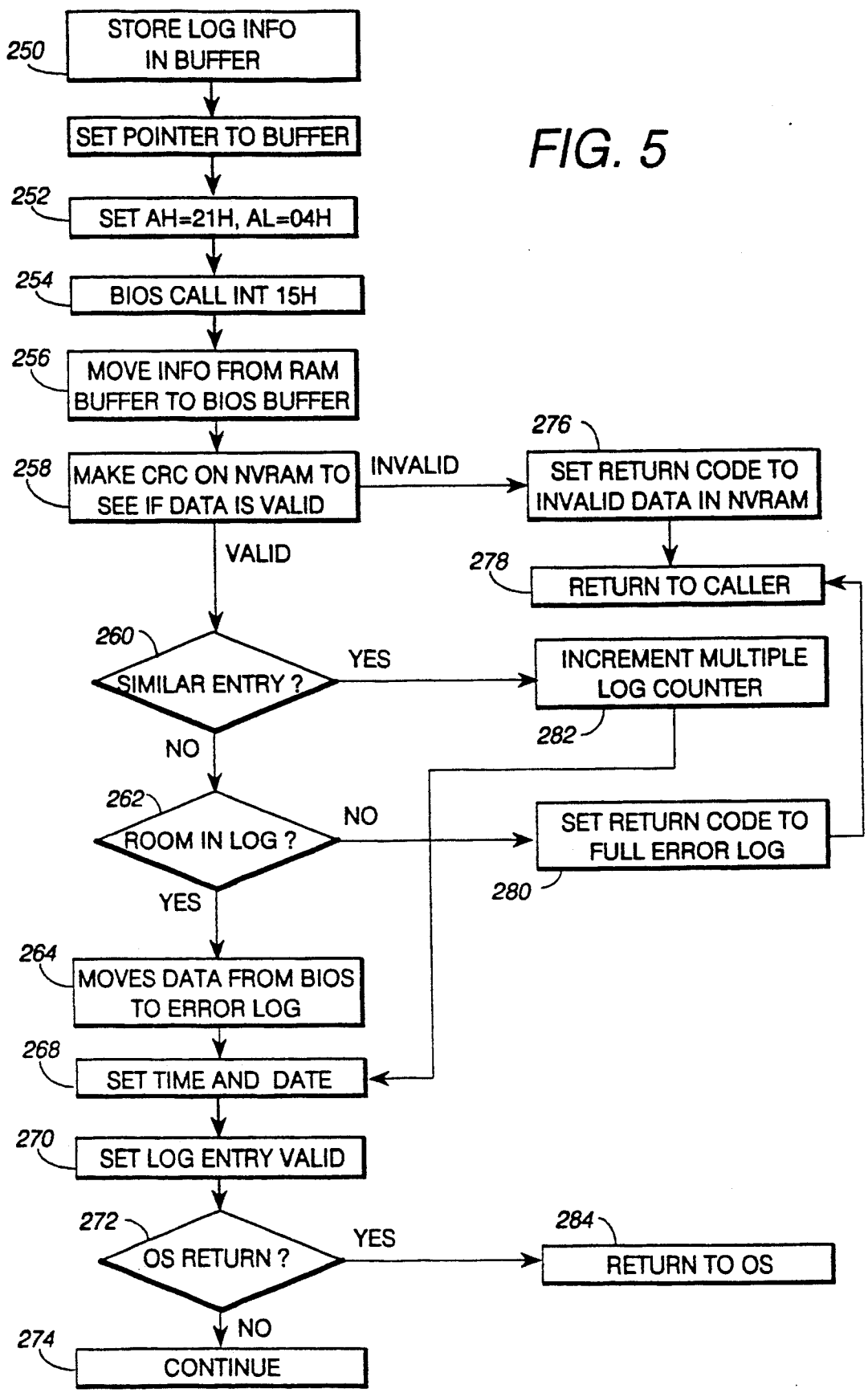
FIG. 5 is a flow diagram illustrating steps for assembling error information and storing it in the error log.
Figure 6:
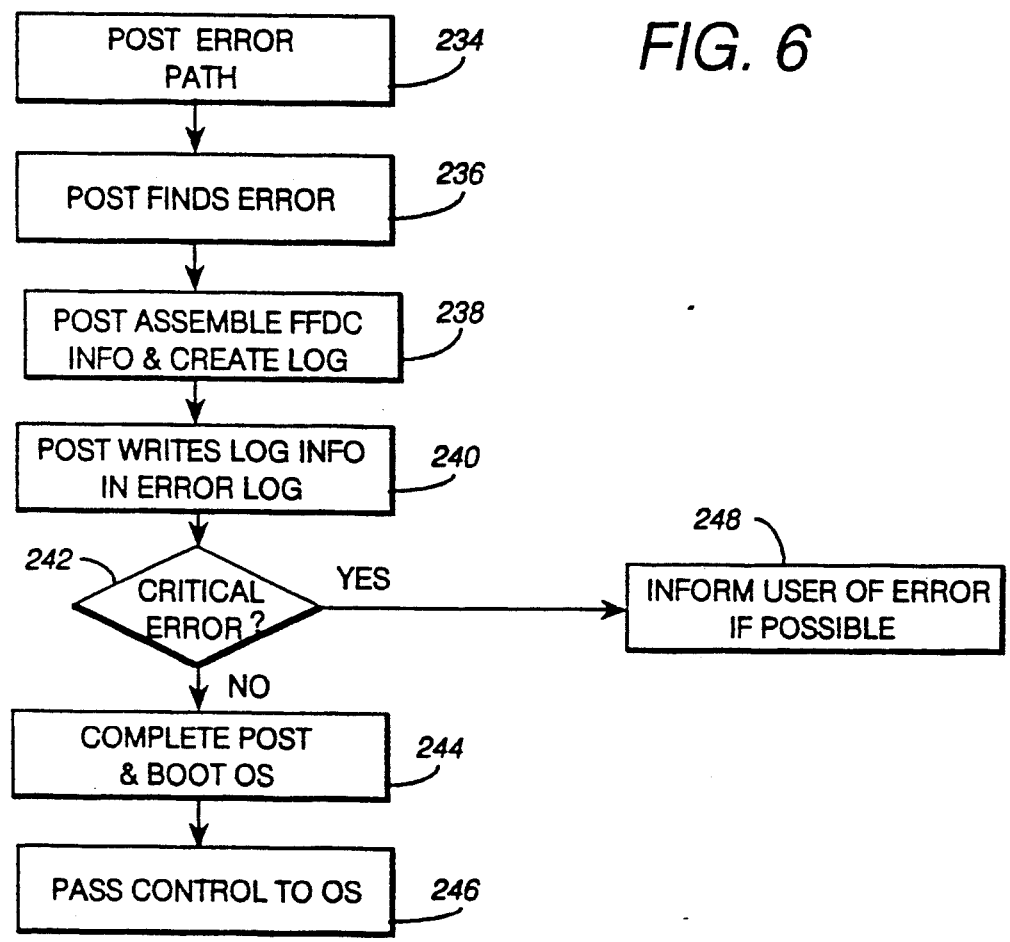
FIG. 6 is a flow diagram of steps occurring during a POST.

The remaining figures in the drawings illustrate use of the error log by different programs. FIGS. 4-6 deal with error logging and what happens when an error occurs, and FIGS. 7 and 8 deal with analysis of the error log. Referring now to FIG. 4, it shows details of step 118 (FIG. 2) for handling errors encountered during operation of the system. After an error has been detected in step 194, an NMI signal or a device driver invokes the BIOS interrupt handler in step 196. Step 198 assembles first failure data capture (FFDC) information from hardware and software status information. Step 198 also includes creating error information which is first stored or written into buffer 131. Such information is then moved into and stored in the error log in step 200 as described in more detail below with reference to FIG. 5. Step 202 checks a flag to see if the OS has a recovery facility which would be used upon completion of the error handling routine. If OS has a recovery facility, a branch is made to step 210. If not, step 204 then completes the interrupt handling directly after step 202. Step 210 is done by the OS which analyzes the information in the error log to see if a return should be made to OS and sets a return status flag appropriately. The OS also determines if the error is critical or non-critical and sets a critical status flag in accordance with such determination. Upon completion of step 204, step 206 checks the critical status flag and if it set to indicate a critical error, control passes to step 209 in which the system must be restarted. If the error is non-critical, then step 207 looks at the return status flag and branches to steps 208 or step 212 dependent on the setting of the flag. Step 208 returns in the manner of a normal interrupt. Step 212 returns to the OS for use of the recovery facility.

FIG. 5 illustrates the detailed steps for using BIOS to write or store information in error log 88. Before BIOS is called, step 250 stores the error information in buffer 131, such information having been collected and formatted in step 200 (FIG. 4). Step 251 then sets a pointer to such buffer in the ES:DI register of microprocessor 12. Next, the AH and AL registers are respectively set in step 252 for an error log write operation, and a BIOS INT 15H call is made in step 254. BIOS then moves the information from buffer 131 into a BIOS buffer (not shown) and performs a character redundancy check (CRC) on NVRAM 30 to determine if the data therein is valid, in step 258. If the data is invalid, step 176 sets a return code indicating such fact, and step 278 returns to the caller.

If the data in NVRAM 30 is valid, step 260 then checks to see if there is a similar entry, i.e., an entry for the same error condition. If there is no similar entry, step 262 checks to see if there is room in the error log for a new entry, by looking at the valid entry bits. If there is room for a new entry, step 264 moves the information or data in the BIOS buffer into error log 88. BIOS then sets the time and date in the error log in step 270 and sets the log entry bit valid for the entry just stored in step 262. Step 272 checks the OS return status flag and branches to step 284 to return to the OS or continues with step 274 with the next step in the process which encountered the error. If step 260 determines there is a similar entry, step 282 then increments the multiple log counter in the error log, and branches to step 268. If step 262 determines the log is full, then a return code is set to indicate such fact and a return is made to the caller in step 278.

FIG. 6 shows the path of steps for handling errors encountered during POST (step 98—FIG. 2 ). After an error has been detected in step 236, POST assembles the FFDC information and creates error log information in step 238. Such information is then written by POST in step 240 directly into the error log directly from POST without using a BIOS call. In such case, POST performs steps similar to those performed by BIOS as explained relative to FIG. 5. Step 242 decides if the error encountered in step 236 is a critical error. If the error is not a critical error such that further operations can be continued perhaps in a degraded fashion, step 244 completes the POST and then loads or boots the OS in normal fashion. Step 246 then passes control to the OS. If step 242 determines the error is critical, then step 246 informs the user of such error if it is at all possible. Obviously, with some errors such as inability to load dynamic RAM, further operations are impossible and the user might only see a blank screen on the display.

Figure 7:
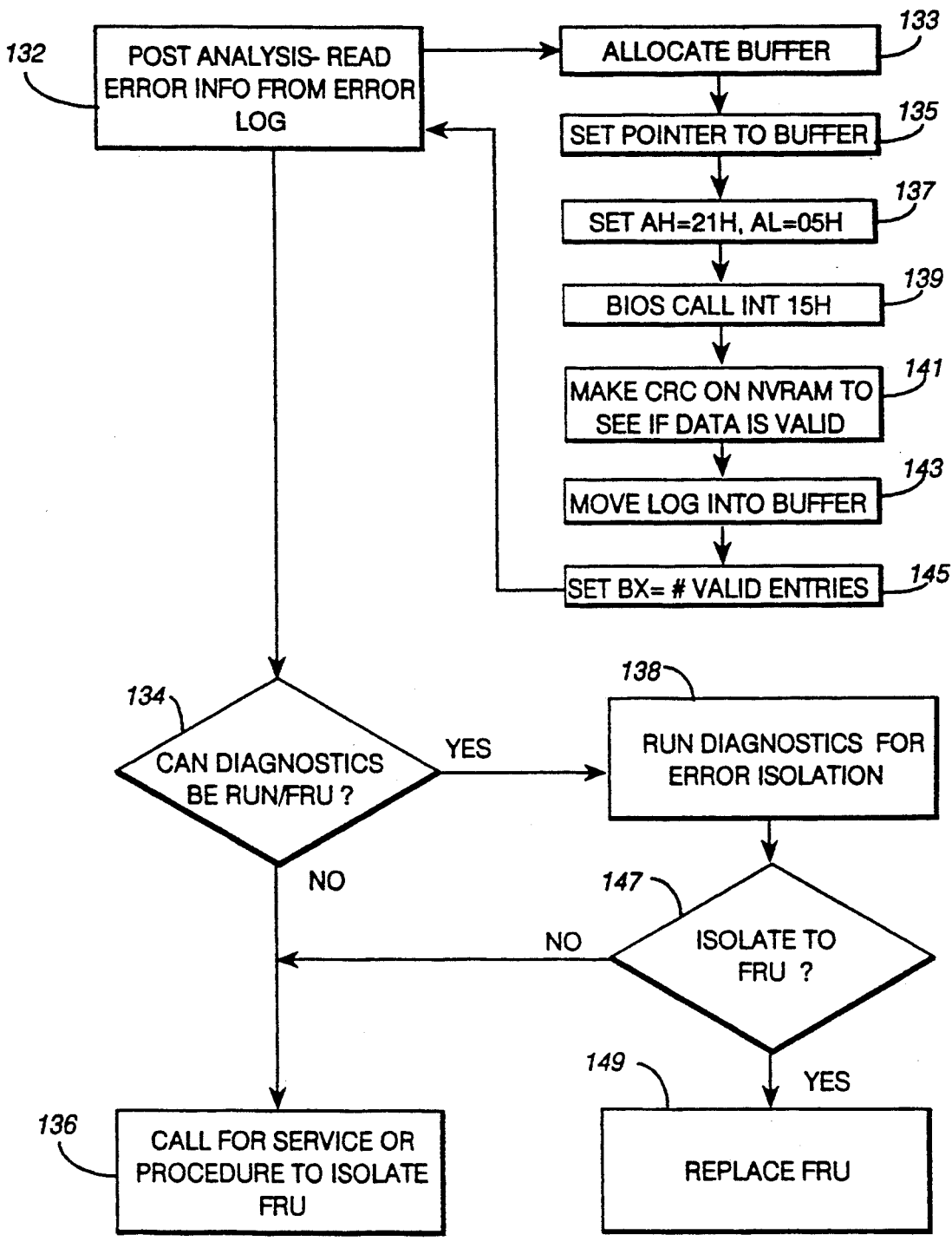
FIG. 7 is a flow diagram of analysis steps occurring during power on self-test (POST)

FIG. 7 shows further details of steps occurring during POST step 107 (FIG. 2). These steps are done to cover the circumstance that a critical error may keep POST step 106 from completing so that the error is isolated to a FRU. Step 132 begins the POST analysis by reading error information from the error log into RAM buffer 131 (FIG. 1). Such reading is done by the more detailed odd numbered steps 133-145. In step 133, RAM buffer 131 is allocated a size sufficient to store the entire error log 88. POST program 40 then stores a pointer to such buffer in registers ES:DI of microprocessor 12. Next, step 137 sets registers AH=21H and AL=05H and step 139 makes the BIOS interrupt call INT 15H. BIOS then performs the next three steps. First step 141 performs a character redundancy check on the data from the error log to determine if the data is valid and sets a return code to indicate the validity of the data. If the data is valid, step 143 then moves, writes or copies the data from the error log into buffer 131 where it becomes available to POST program 40. BIOS then in step 145 sets register BX of microprocessor 12 to indicate the number of valid entries in error log 88, this step being done by looking at byte 0, bit 7 of each entry described above. Following step 145, control is returned to POST program 40 step 132.

Upon completion of step 132, step 134 then analyzes the error log information in buffer 131 and determines if any error logged therein is so critical that diagnostic program 122 cannot be run to isolate the FRU from which the error arose. If it can't, step 136 informs the user to call for service or identifies what procedure can be used, to isolate the error. If step 134 results in a positive determination, step 138 then sets the error log status byte- bit 5 and runs the diagnostic program to attempt to isolate the error. Such program does this by analyzing the error log information to determine the source of the error and then looking up in VPD 92 VPD information identifying the part number or FRU for such source. If the error can be isolated to a FRU, step 147 then passes the VPD to the user so that the FRU can be replaced in step 149. If the diagnostic program is not able to isolate the error, step 147 then branches to step 136.

Figure 8:
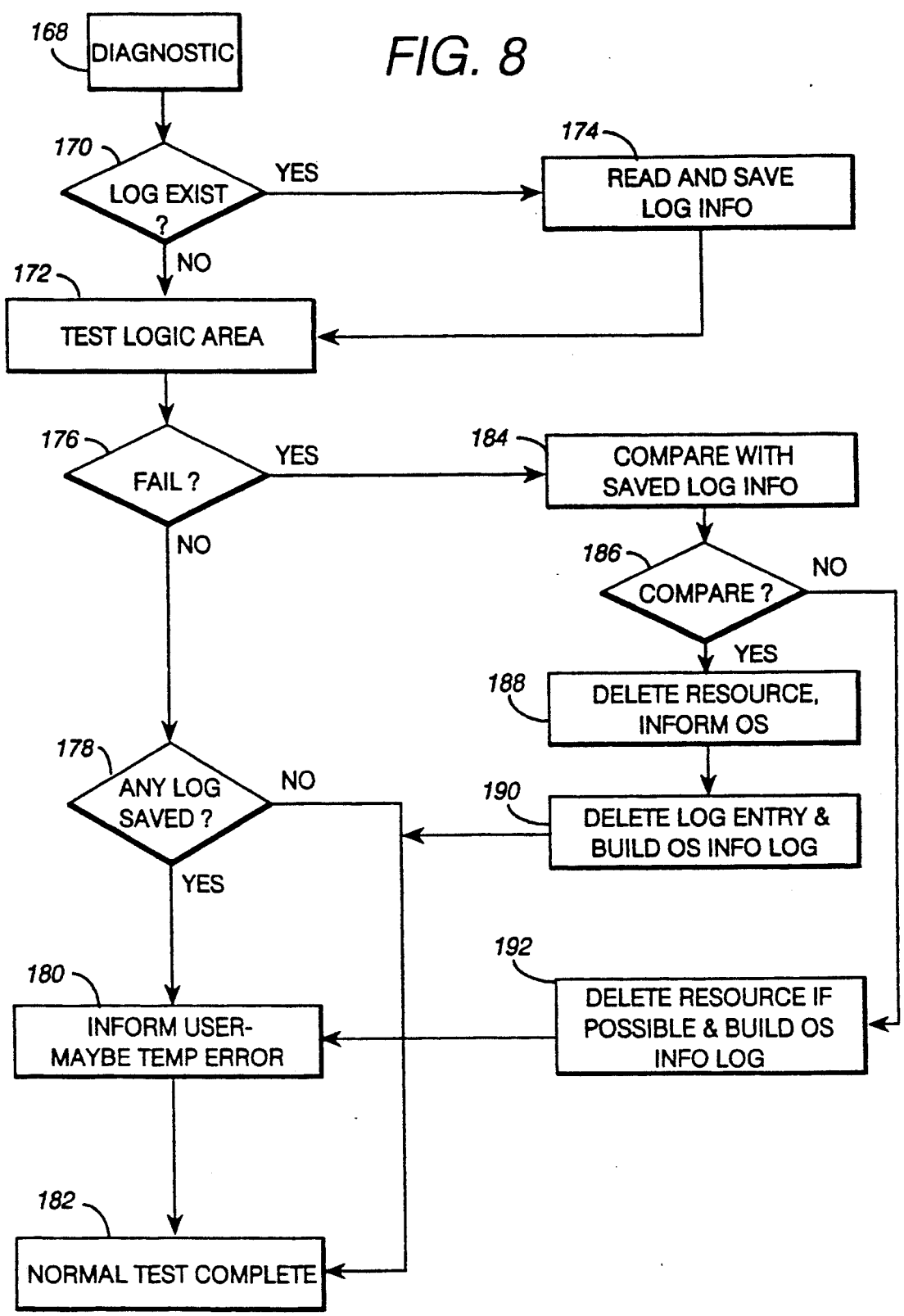
FIG. 8 is a flow diagram of steps occurring during execution of a diagnostic program.

Referring to FIG. 8, during execution of diagnostic program 122 in step 168, step 170 determines if there is any valid entry in the error log. If not, step 172 then tests a logic area and step 176 determines if an error or failure occurred during the test. If not, step 178 then sees if any log entry has been saved by step 174, and if one has, step 180 informs the user that a temporary error may have occurred. This procedure detects a temporary error that resulted in a log entry being made previously and where the error was not repeated or found in test 172. Upon completion of step 180, the normal test is completed. If step 170 results in a positive determination, step 174 then reads and saves log information for future reference and branches to step 172. If step 176 results in a positive determination, step 184 then compares the cause of failure with the log information saved in step 174. If they compare, step 188 deletes the resource (e.g. by deleting a block of memory from which the error arose) and informs the OS. Step 190 then deletes the log entry corresponding to such resource, builds an OS information log (error log status byte- bit 6) indicating the deletion and branches to step 182. If step 186 notes an inequality or non-comparison, a branch is made to step 192 which deletes the resource if possible, builds an OS information log, and branches to step 180.

It should be apparent to those skilled in the art that many changes can be made in the details and arrangements of steps and parts without departing from the scope of the invention as defined in the appended claims.

What is claimed is:

1. A diagnostic system for a personal computer having a storage system for storing a plurality of programs including application programs, an operating system and a BIOS; and a microprocessor for executing said programs; said BIOS containing a plurality of routines which are functionally layered beneath said operating system and are independent thereof but are accessible from said operating system by an interface of a plurality of BIOS interrupt calls; said diagnostic system comprising:
   a non-volatile memory having a first address space for storing an error log, said error log comprising a plurality of predetermined addressable locations for storing predetermined error information in a predetermined format; and
   said BIOS including a plurality of diagnostic related routines including a first routine for writing error information into said error log and a second routine for reading error information from said error log, said first routine being executable in response to a first BIOS interrupt call, and said second routine being executable in response to a second BIOS interrupt call.

2. A diagnostic system in accordance with claim 1 wherein:
   said error log comprises a plurality of addressable locations for storing said error information, said error information comprising an indication of source of an error, type of error, and when error occurred.

3. A diagnostic system in accordance with claim 2, wherein:
   said error log contains a plurality of entries, each entry containing error information for a different error, each entry further containing entry status information including an indication of whether or not a given entry is valid.

4. A diagnostic system in accordance with claim 3 wherein said entry status information indicates a permanent error and a temporary error.

5. A diagnostic system in accordance with claim 3 wherein said entry includes an extended status field for storing information specific to a given error, and said entry includes a plurality of logic status indications identifying what type of information is stored in said extended status field.

6. A diagnostic system in accordance with claim 3 wherein said error log further contains a multiple log counter for counting plural occurrences of same error condition from same source or different sources.

7. A diagnostic system in accordance with claim 2 wherein:
   one of said programs includes an error handling third routine responsive to an occurrence of an error during system operation for gathering error information and assembling such error information in a buffer in said predetermined format; and
   said first routine in said BIOS being operative to write said error information from said buffer into said predetermined locations in said error log.

8. A diagnostic system in accordance with claim 7 wherein said third routine is included in said BIOS and is executed in response to occurrence of a non-maskable interrupt signal.

9. A diagnostic system in accordance with claim 2 wherein said personal computer has a power-on, self-text (POST) program stored therein for testing said computer in response to a system restart, said POST program including a fourth routine for calling said second routine by executing said second BIOS interrupt call to read error information from said error log for analysis by said POST program.

10. A diagnostic system in accordance with claim 9 wherein said POST program includes an error handling routine operative in response to an error occurring when POST is executed to collect error information for such error, assemble such information into said predetermined format, and write such formatted information directly in said error log at said predetermined locations without having to execute said first BIOS interrupt call.

11. A diagnostic system in accordance with claim 2 comprising a diagnostic program executable by said microprocessor for accessing said error log and testing operation of said computer.

12. A diagnostic system in accordance with claim 2 wherein:
   said non-volatile memory comprises a second address space for storing vital product data including identifying different field replaceable units in said computer;
   and said diagnostic system further comprises a routine for reading error information from said error log and identifying from said vital product data which field replacement unit to replace when an error originates therefrom.

* * * * *